(12) United States Patent
Juarez

(10) Patent No.: US 8,236,101 B1
(45) Date of Patent: Aug. 7, 2012

(54) SWIMMING POOL PLASTER ENHANCEMENT

(76) Inventor: LeRoy Juarez, Downey, CA (US)

( * ) Notice: Subject to any disclaimer, the term of this patent is extended or adjusted under 35 U.S.C. 154(b) by 0 days.

(21) Appl. No.: 13/091,408

(22) Filed: Apr. 21, 2011

(51) Int. Cl.
| | |
|---|---|
| *C04B 7/02* | (2006.01) |
| *C04B 7/00* | (2006.01) |
| *C04B 7/36* | (2006.01) |
| *C04B 111/74* | (2006.01) |

(52) U.S. Cl. ........ 106/733; 106/639; 106/712; 106/737; 106/741; 106/819

(58) Field of Classification Search .......... 106/712, 106/733, 639, 737, 741, 819
See application file for complete search history.

(56) References Cited

U.S. PATENT DOCUMENTS

| | | |
|---|---|---|
| 4,010,134 A | 3/1977 | Braunisch et al. |
| 5,215,583 A | 6/1993 | Krockert et al. |
| 5,849,218 A | 12/1998 | Johansen, Jr. et al. |
| 6,596,074 B2 | 7/2003 | Pomeroy |
| 7,300,514 B2 * | 11/2007 | Bonafous et al. ............. 106/712 |
| 7,754,788 B2 | 7/2010 | Brox et al. |
| 2007/0110907 A1 | 5/2007 | Brown |
| 2010/0130650 A1 | 5/2010 | Pepe et al. |
| 2010/0266470 A1 | 10/2010 | Ancora et al. |

FOREIGN PATENT DOCUMENTS

WO    WO2004/074202 A1 *    9/2004

* cited by examiner

*Primary Examiner* — Anthony J Green
(74) *Attorney, Agent, or Firm* — Kenneth L. Green

(57) ABSTRACT

A method for preparing swimming pool plaster includes the addition of titanium dioxide ($TiO_2$) to white swimming pool plaster mixture to improve the appearance of the plaster and reduce or eliminate mottling. Approximately two pounds of $TiO_2$ is added per sack of cement. For example, approximately ten pounds of $TiO_2$ may be added to a 5/7 bag mix of cement and pool sand. The $TiO_2$ is added to water in a mixer in a first step, and the $TiO_2$ and water are mixed dissolving the $TiO_2$ in the water before adding cement or pool sand, thereby providing better mixing of all of the ingredients.

7 Claims, 1 Drawing Sheet

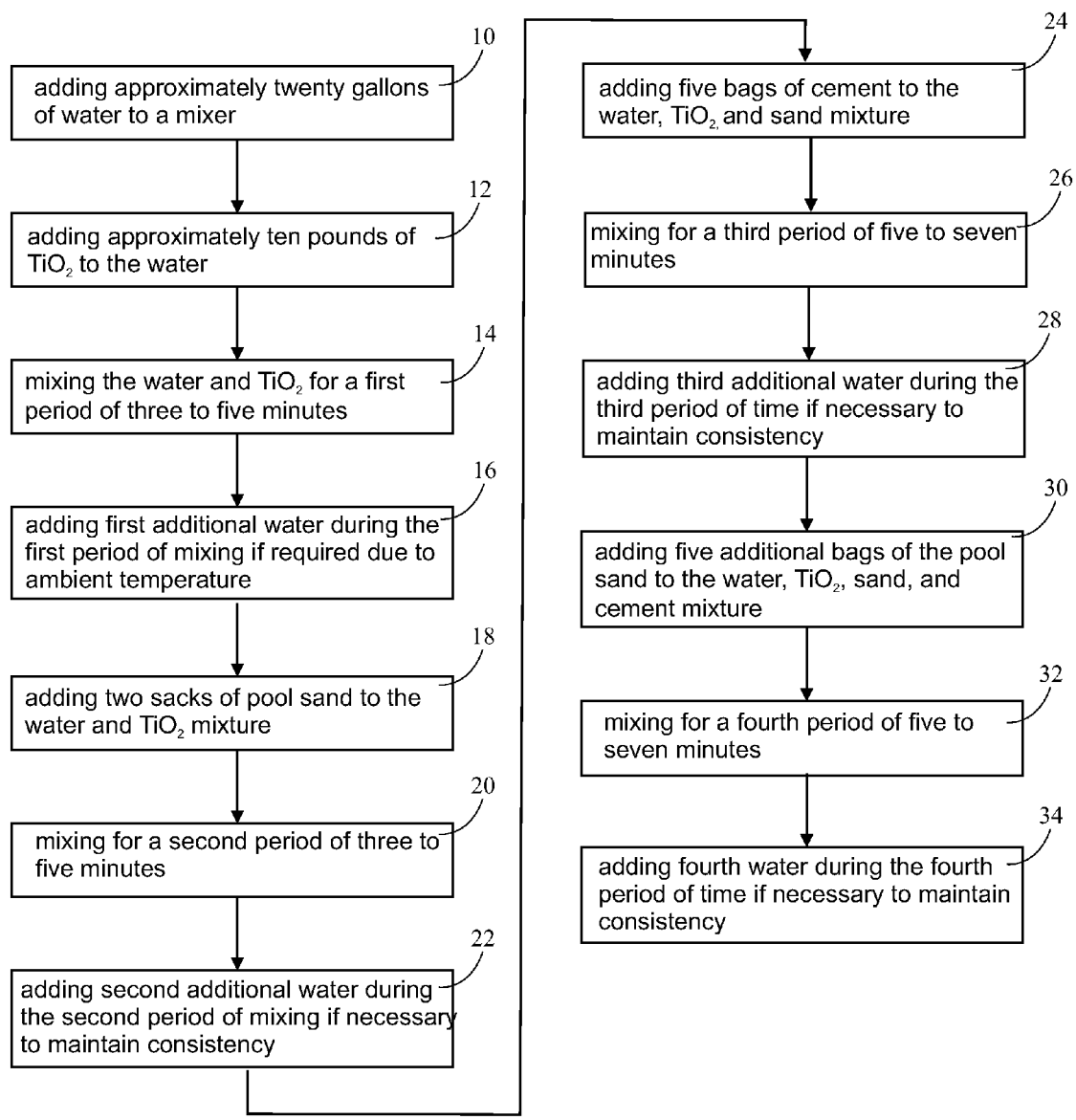

SWIMMING POOL PLASTER ENHANCEMENT

BACKGROUND OF THE INVENTION

The present invention relates to swimming pool plaster and in particular to methods for reducing discoloration and mottling in white swimming pool plaster.

White pool plaster often discolors and mottles over time. Such discoloration and mottling is a well known problem in the swimming pool industry and efforts to significantly reduce discoloration and mottling are ongoing. Organizations such as the National Plasterers Council were formed to provide support to the swimming pool industry. Additionally, California Polytechnic San Luis Obispo is home to the National Pool Industry Research Center where twelve pools and four spas provide a capability to investigate swimming pool plaster discoloration and mottling, etching, various sun tanning, product durability, and other issues related to the pool industry.

While some methods include of adding titanium dioxide ($TiO_2$) to pool plaster, these methods do not address the discoloration and mottling problem as evidenced by the ongoing research.

BRIEF SUMMARY OF THE INVENTION

The present invention addresses the above and other needs by providing a method for preparing swimming pool plaster which includes the addition of titanium dioxide ($TiO_2$) to white swimming pool plaster mixture to improve the appearance of the plaster and reduce or eliminate mottling. Approximately two pounds of $TiO_2$ is added per sack of cement. For example, approximately ten pounds of $TiO_2$ may be added to a 5/7 bag mix of cement and pool sand. The $TiO_2$ is added to water in a mixer in a first step, and the $TiO_2$ and water are mixed dissolving the $TiO_2$ in the water before adding cement or pool sand, thereby providing better mixing of all of the ingredients.

In accordance with one aspect of the invention, there is provided a method for mixing white pool plaster. The method includes mixing $TiO_2$ with water before adding sand and cement. Mixing the $TiO_2$ with water first allows the $TiO_2$ to dissolve in the water providing better results.

In accordance with another aspect of the invention, there is provided an embodiment of the method for mixing white pool plaster. The embodiment includes: adding approximately twenty gallons of water to a mixer; adding approximately ten pounds of titanium dioxide ($TiO_2$) to the water; mixing the water and $TiO_2$ for a first period of three to five minutes; adding first additional water during the first period of mixing if required due to ambient temperature; adding two sacks of pool sand to the water and $TiO_2$ solution; mixing for a second period of three to five minutes; adding second additional water during the second period of mixing if necessary to maintain consistency; adding five bags of cement to the water, $TiO_2$, and sand mixture; mixing for a third period of five to seven minutes; adding third additional water during the third period of time if necessary to maintain consistency; adding five additional bags of the pool sand to the water, $TiO_2$, sand, and cement mixture; mixing for a fourth period of five to seven minutes; and adding fourth water during the fourth period of time if necessary to maintain consistency.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 shows a method according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A long felt need exists for reducing discoloration and mottling of swimming pool plaster. Known methods for reducing or preventing discoloration and mottling of swimming pool plaster include adding titanium dioxide ($TiO_2$) to a water, cement, and sand mixture, but the known methods do not produce a uniform result. The present invention is a method for mixing the water, $TiO_2$, cement, and sand which overcomes this problem. The method consists essentially of mixing the water and $TiO_2$ before adding the cement and sand. Approximately two pounds of $TiO_2$ is added per sack of cement.

In one embodiment of the method according to the present invention, a first amount of sand is added to the water and $TiO_2$ solution, mixing the water, $TiO_2$, and sand, then adding cement to the water, $TiO_2$, and sand mixture. In another embodiment of the method, additional sand is added to the water, $TiO_2$, sand, and cement mixture.

One common pool plaster mix is a 5/7 bag mix of cement and pool sand. An embodiment of the method according to the present invention for preparing the 5/7 bag mix includes the steps of: adding approximately twenty gallons of water to a mixer at step 10; adding approximately ten pounds of titanium dioxide ($TiO_2$) to the water at step 12; mixing the water and $TiO_2$ for a first period of three to five minutes at step 14; adding first additional water during the first period of mixing if required due to ambient temperature at step 16; adding two sacks of pool sand to the water and $TiO_2$ solution at step 18; mixing for a second period of three to five minutes at step 20; adding second additional water during the second period of mixing if necessary to maintain consistency at step 22; adding five bags of cement to the water, $TiO_2$, and sand mixture at step 24; mixing for a third period of five to seven minutes at step 26; adding third additional water during the third period of time if necessary to maintain consistency at step 28; adding five additional bags of the pool sand to the water, $TiO_2$, sand, and cement mixture at step 30; mixing for a fourth period of five to seven minutes at step 32; and adding fourth water during the fourth period of time if necessary to maintain consistency at step 34.

In a preferred embodiment of the method of the present invention, the water and $TiO_2$ solution consists essentially of water and $TiO_2$, where the $TiO_2$ is at least 99 percent pure $TiO_2$.

While the invention herein disclosed has been described by means of specific embodiments and applications thereof, numerous modifications and variations could be made thereto by those skilled in the art without departing from the scope of the invention set forth in the claims.

I claim:

1. A method for preparing a batch of plaster to swimming pools, the method comprising the ordered steps of:

adding approximately twenty gallons of water to a mixer;

adding approximately ten pounds of titanium dioxide ($TiO_2$) to the water to create a water and $TiO_2$ solution;

mixing the water and $TiO_2$ for a first period of three to five minutes;

adding first additional water to the water and TiO$_2$ solution during the first period of mixing if required due to ambient temperature;

adding two sacks of pool sand to water and TiO$_2$ solution;

mixing for a second period of three to five minutes;

adding second additional water during the second period of mixing if necessary to maintain consistency;

adding five bags of cement to the water, TiO$_2$, and sand mixture;

mixing for a third period of five to seven minutes;

adding third additional water during the third period of time if necessary to maintain consistency;

adding five additional bags of the pool sand to the water, TiO$_2$, sand, and cement mixture;

mixing for a fourth period of five to seven minutes; and adding fourth water during the fourth period of time if necessary to maintain consistency.

2. A method for mixing swimming pool plaster, the method comprising:

determining a number of bags of cement to include in the pool plaster;

adding water to a mixer;

adding 2 pounds of titanium dioxide (TiO$_2$) per number of bags of cement to the water;

mixing the water and TiO$_2$ for a first period of time to create a water and TiO$_2$ solution;

after the first period of time, adding sand and the number of bags of cement to the water and TiO$_2$ solution; and mixing the water, TiO$_2$, sand, and cement mixture for a second period of time.

3. The method of claim 2, wherein the first period of time is between three and five minutes.

4. The method of claim 2, wherein the first period of time is sufficiently long to dissolve the TiO$_2$ in the water.

5. The method of claim 2, wherein, after the first period of time, adding sand and cement to the water and TiO$_2$ solution comprises:

adding sand to the water and TiO$_2$ solution;

mixing the water, TiO$_2$, and sand mixture;

adding cement to the water, TiO$_2$, and sand mixture; and mixing the water, TiO$_2$, sand, cement, and additional sand mixture.

6. The method of claim 5, further including adding additional sand to the mix.

7. A method for preparing a batch of plaster to swimming pools, the method comprising the ordered steps of:

adding approximately twenty gallons of water to a mixer;

adding approximately ten pounds of titanium dioxide (TiO$_2$) to the water to create a water and TiO$_2$ solution;

mixing the water and TiO$_2$ for a first period of three to five minutes;

adding two sacks of pool sand to water and TiO$_2$ solution;

mixing for a second period of three to five minutes;

adding second additional water during the second period of mixing if necessary to maintain consistency;

adding five bags of cement to the water, TiO$_2$, and sand mixture;

mixing for a third period of five to seven minutes;

adding third additional water during the third period of time if necessary to maintain consistency;

adding five additional bags of the pool sand to the water, TiO$_2$, sand, and cement mixture;

mixing for a fourth period of five to seven minutes; and adding fourth water during the fourth period of time if necessary to maintain consistency.

* * * * *